(12) United States Patent
Sparkman

(10) Patent No.: US 10,112,503 B1
(45) Date of Patent: Oct. 30, 2018

(54) SEAT LOCKING SYSTEM AND METHOD OF USE

(71) Applicant: Gregory A. Sparkman, Southlake, TX (US)

(72) Inventor: Gregory A. Sparkman, Southlake, TX (US)

( * ) Notice: Subject to any disclaimer, the term of this patent is extended or adjusted under 35 U.S.C. 154(b) by 74 days.

(21) Appl. No.: 15/584,215

(22) Filed: May 2, 2017

Related U.S. Application Data

(60) Provisional application No. 62/330,709, filed on May 2, 2016.

(51) Int. Cl.
| | |
|---|---|
| *B60R 21/00* | (2006.01) |
| *B60N 2/01* | (2006.01) |
| *B60N 2/00* | (2006.01) |
| *B60N 2/015* | (2006.01) |
| *B60N 2/005* | (2006.01) |

(52) U.S. Cl.
CPC ......... *B60N 2/01516* (2013.01); *B60N 2/005* (2013.01); *B60N 2/01508* (2013.01); *B60R 21/00* (2013.01)

(58) Field of Classification Search
CPC ................ B60N 2/01516; B60N 2/005; B60N 2/01508; B60R 21/00
See application file for complete search history.

(56) References Cited

U.S. PATENT DOCUMENTS 5,529,185 A * 6/1996 Alspach ............. B60N 2/01508
108/55.3

FOREIGN PATENT DOCUMENTS

DE 102007037528 A1 * 2/2009 ......... B60N 2/01516
FR 3023223 A1 * 1/2016 ............. B60N 2/005

* cited by examiner

*Primary Examiner* — D Glenn Dayoan
*Assistant Examiner* — Melissa A Black
(74) *Attorney, Agent, or Firm* — Eldredge Law Firm, LLC; Richard Eldredge; Beth Felix

(57) ABSTRACT

A vehicle seat system includes a seat having a base and an elongated shaft extending from the base. The system also includes a seat mount secured to a vehicle and configured to removably secured the seat to the vehicle. The seat mount has a body forming an inner cavity; a slide bar configured to slide within the cavity of the body; a spring disposed with the cavity and secured to the slide bar; a plurality of channels formed on a top surface of the body; a plurality of arms pivotally attached to the slide bar; a quick-release device configured to engage with the slide bar and configured to hold the slide bar in a fixed position; and a pull device connected to the quick-release device and configured to release the slide bar from the fixed position.

1 Claim, 6 Drawing Sheets

SEAT LOCKING SYSTEM AND METHOD OF USE

BACKGROUND

1. Field of the Invention

The present invention relates generally to locking devices for seat, more specifically, to a locking mechanism for vehicle seats.

2. Description of Related Art

Vehicle seats are well known in the art and are effective means to protect the driver and passengers from harm during an accident. FIG. 1 depicts a side view of a conventional seat 101 having a backrest 105 pivotally attached to a base 103 via a pivot joint 107. The base 103 is adjusted relative to the frame of the vehicle (not shown) via a locking device 109. The arrows A and B illustrates the movement of the backrest 105 relative to the base 103 and the movement of the locking device 109 relative to the vehicle frame.

One of the problems commonly associated with the seat 101 is the limited use. For example, seat 101 remains secured to the vehicle frame via the locking device 109. In the event of an accident, the driver and/or passengers seats could possibly obstruct the parties from exiting the vehicle. Further, it may be desired to interchange the seats, for example, a racing seat may be desired in lieu of a standard vehicle seat; seat 101 does not provide means for interchanging seats.

Although great strides have been made in the field of vehicle seats, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
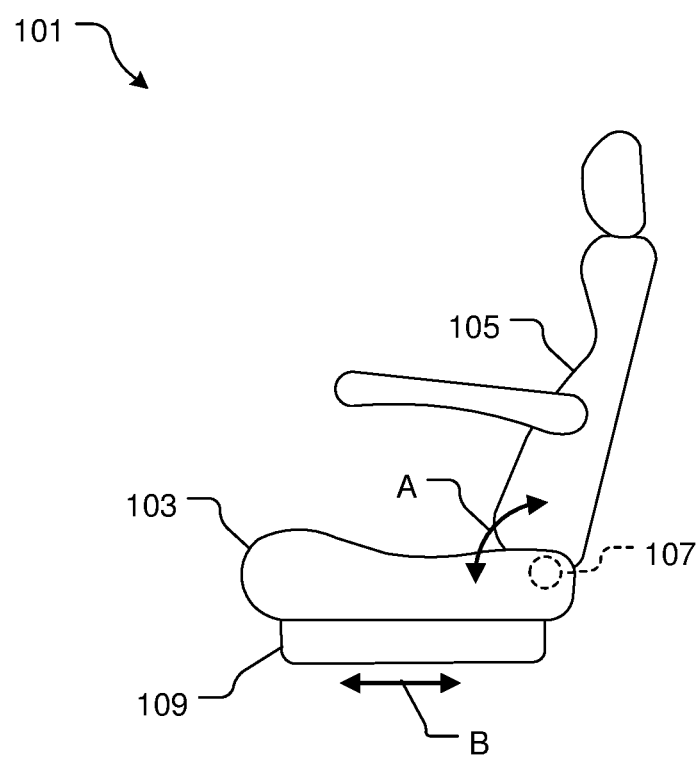
FIG. 1 is a side view of a conventional vehicle seat.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2A:
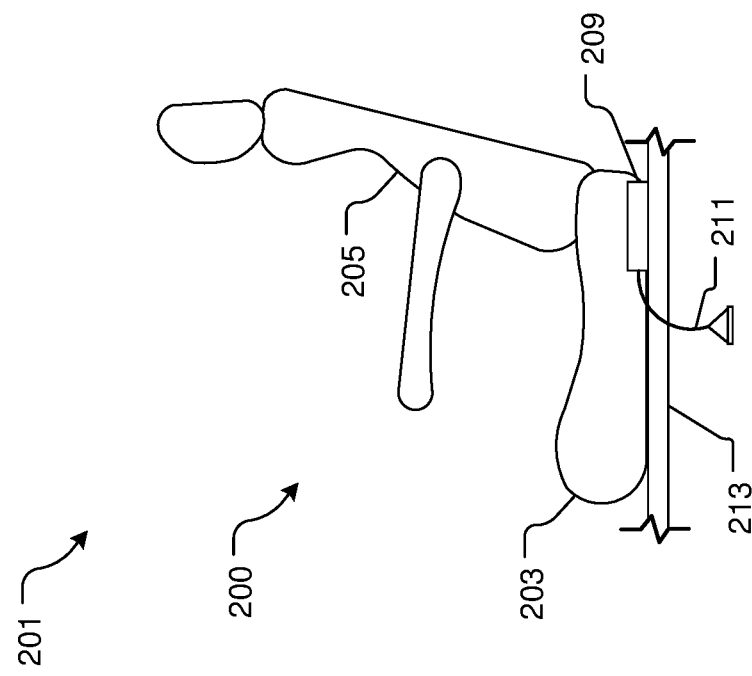
FIGS. 2A and 2B are side views of a vehicle seat in accordance with a preferred embodiment of the present application.
Figure 2B:
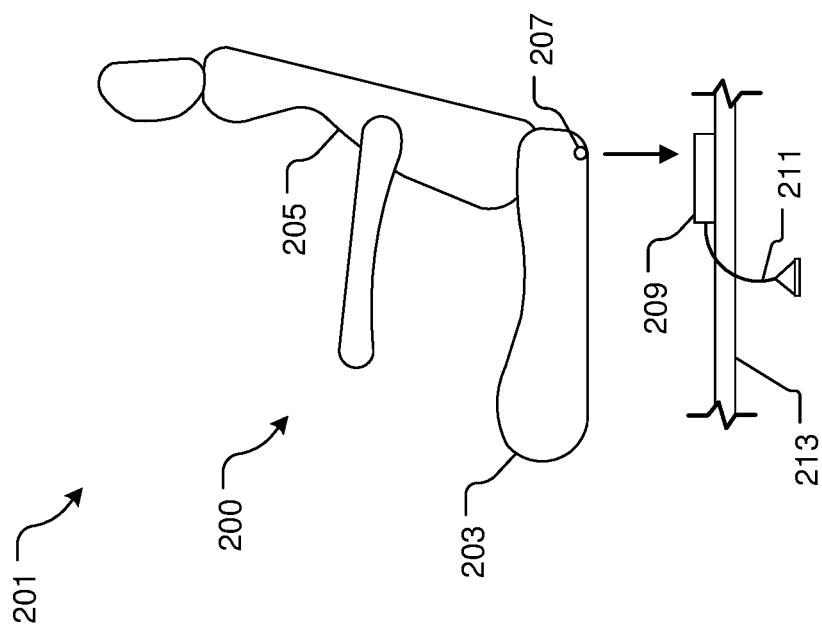

Referring now to the drawings wherein like reference characters identify corresponding or similar elements throughout the several views, FIG. 2 depicts a side view of a vehicle seat system 201 in accordance with a preferred embodiment of the present application. It will be appreciated that system 201 overcomes one or more of the problems commonly associated with conventional seats.

System 201 includes a seat 200 operably associated with a seat mount 209. During use, the seat mount 209 is configured to removably attach the seat 200 to the vehicle frame (not shown). These features overcome the problems discussed above, specifically, by enabling the seat to be removed during an accident and/or interchanged for a different type of seat. In the exemplary embodiment, seat 200 is a vehicle seat; however, it will be appreciated that the features discussed herein could also be utilized with seats of different types of moving structures, for example, bikes, motorcycles, and the like.

Seat 200 includes a backrest 205 pivotally attached to a base 203 and is further provided with an attachment shaft 207 secured to and protruding from base 203 for engagement with seat mount 209.

The seat mount 209 is secured to a frame member 213 of the vehicle and includes a quick release device operably associated with a pull device 211. In the exemplary embodiment, the pull device 211 is a cable operated cam. During use, the user pulls the pull device 211, which in turn releases shaft 207 from the seat mount 209.

It will be appreciated that multiple seat mounts 209 could be utilized in lieu of the example embodiment showing a single seat mount. Also, it will be appreciated that other fastening means, although not shown, are utilized to secure the base 203 to the frame member 213.

Figure 3:
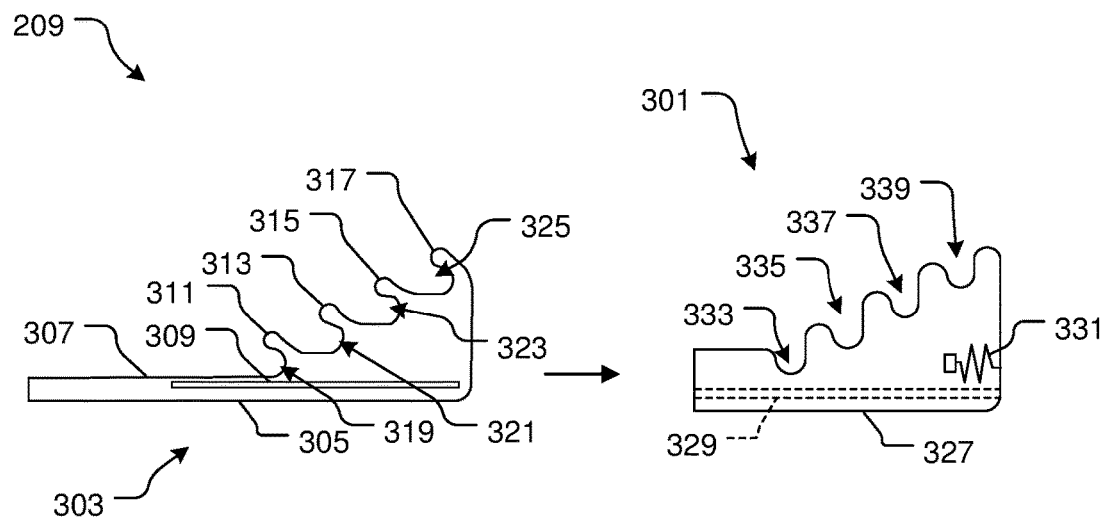
FIG. 3 is a side disassembled view of a seat mount of the system of FIG. 2A.
Figure 4:
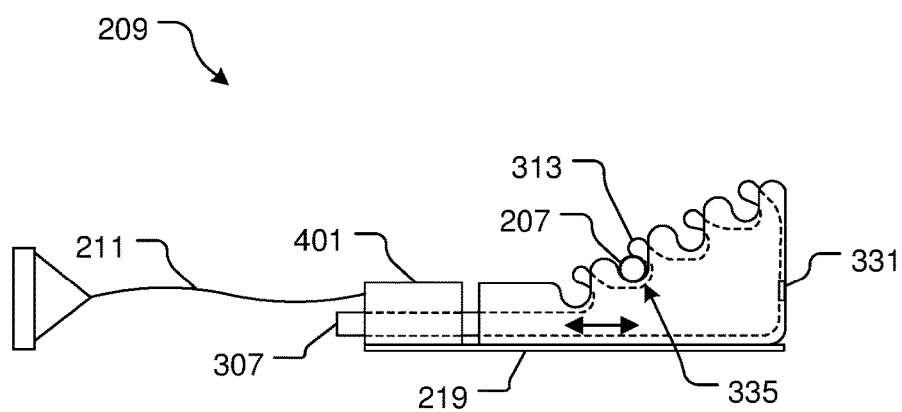
FIG. 4 is a side assembled view of the seat mount of FIG. 3.
Figure 5:
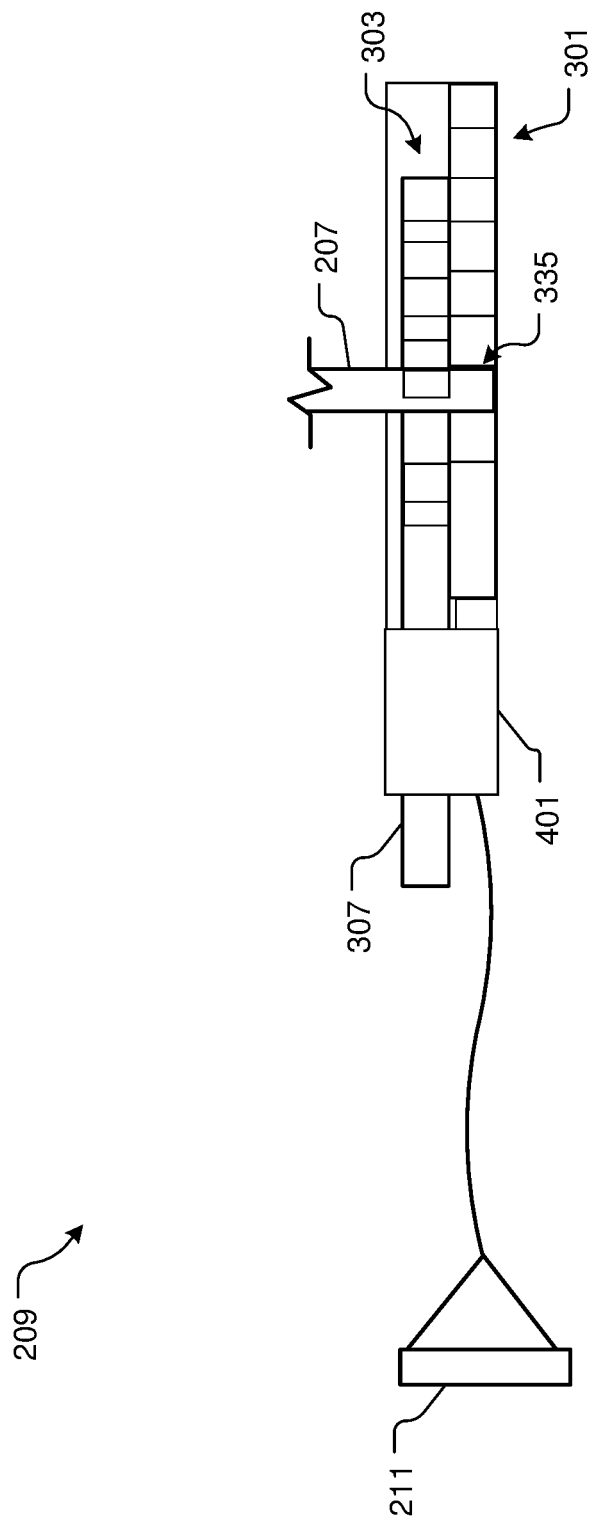
FIG. 5 is a top view of the seat mount of FIG. 4.

Referring now to FIGS. 3-5, side and top views of the seat mount 209 are shown. In FIG. 3, a disassembled side view of the seat mount 209 is shown having a first locking member 303 slidingly engaged with a second locking member 303.

Second locking member 303 includes a body 305 with an elongated section 307 adapted to engage with a quick-release device 401 (see e.g., FIG. 4). In the preferred embodiment, the slide bar is configured to releasably engage with the device and held in a fixed position until pull device 211 is applied. In one contemplated embodiment, a rail 309 extends from side surface of the body 305 and is adapted to engage with a groove 329 of first locking member 301. During use, the second locking member 303 slidingly engages with the first locking member 301 via the rail 309 and groove 329. However, it will be appreciated that other configurations could include one or more different means to enable the second locking member to slidingly engage with the first locking member.

The spring 311 is disposed within a hollow interior of the body 327 and configured to engage with second locking member 303. During use, the spring 331 causes a force against the second locking member 303 relative to the first locking member 301.

The second member 303 is further provided with a plurality of arms 311, 313, 315, and 317 forming respective locking cavities 319, 321, 323, and 325. The locking cavities provide an opening with respective channels 333, 335, 337, and 339 of first locking member 301. As depicted in FIG. 4, the shaft 207 is adapted to fit within the locking cavities and the channels. The arms of second locking member 303 is adapted to secure the shaft within the cavities and channels.

It will be appreciated that the cavities and channels are spaced apart and at a different height relative to each other for selective adjustment of the seat relative to the vehicle frame 219.

In the preferred embodiment, the locking device 401 is a cable operated cam adapted to release the second locking member 303 relative to the first locking member 301 via the pull device 211. Pressure against the locking members and quick-release device is caused by the spring 311. It will be appreciated that alternative embodiments could utilize different types of quick-release devices in lieu of the preferred embodiment.

Figure 6:
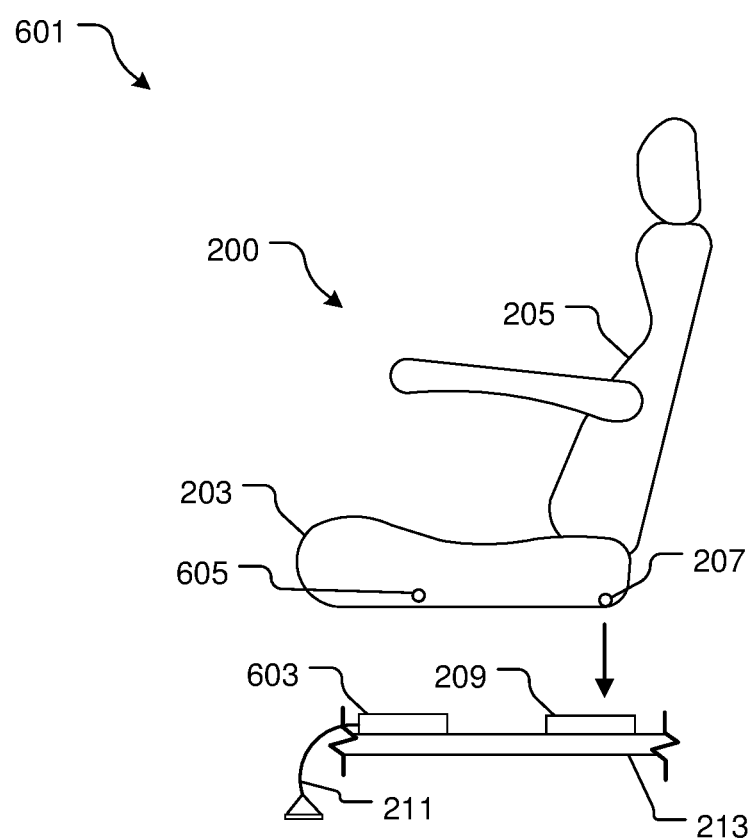
FIG. 6 is a side view of a vehicle seat in accordance with an alternative embodiment.

Referring now to FIG. 6 in the drawings, an alternative embodiment of system 201 is shown. It will be appreciated that system 601 is substantially similar in form and function to system 201; however, in this embodiment the seat is secured to frame 213 via four seat mounts (only two are shown in the exemplary embodiment) on opposing sides of the seat. In the exemplary embodiment, two seat mounts 209, 603 are shown operably associated with respective shafts 207, 605 in a similar manner discussed above.

Figure 7A:
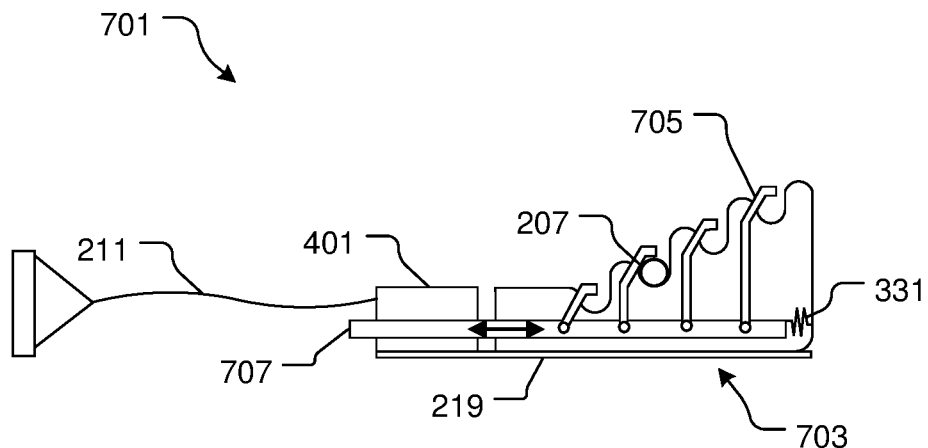
FIGS. 7A and 7B are side views of a seat mount in accordance with an alternative embodiment.
Figure 7B:
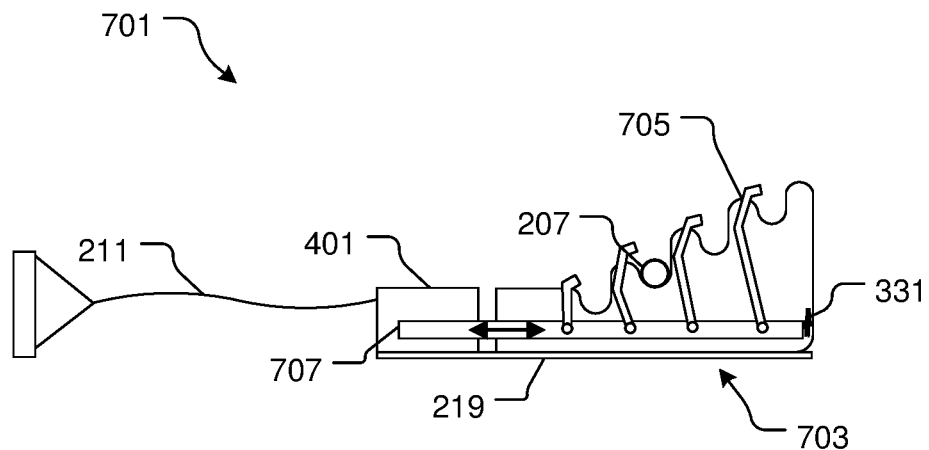

In FIGS. 7A and 7B, an alternative embodiment of the seat mount is shown. It will be appreciated that seat mount 701 is substantially similar in form and function to seat mount 209; however, in the contemplated embodiment seat mount 701 is provided with a link assembly 703 having a plurality of pivoting arms 705 pivotally attached to a horizontal slide bar 707 that engages with locking device 401. As shown in the exemplary embodiment, the link assembly 703 is configured to engage with shaft 207. During use, the pull device 211 is configured to release the bar 707, which in turn opens the channels configured to retain the shaft therein.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A vehicle seat system, comprising:
   a seat having:
      a base; and
      an elongated shaft extending from the base; and
   a seat mount secured to a vehicle and configured to removably secured the seat to the vehicle, the seat mount having:
      a body forming an inner cavity;
      a slide bar configured to slide within the cavity of the body;
      a spring disposed with the cavity and secured to the slide bar, the spring is configured to push the slide bar in a direction outside the cavity;
      a plurality of channels formed on a top surface of the body, the plurality of channels is configured to receive the elongated shaft;
      a plurality of arms pivotally attached to the slide bar, the plurality of arms is configured to pivots upon sliding motion of the slide bar and is configured to close an opening of the plurality of channels;
      a quick-release device configured to engage with the slide bar, the quick-release device is configured to hold the slide bar in a fixed position; and
      a pull device connected to the quick-release device, the pull device is configured to release the slide bar from the fixed position;
   wherein the plurality of channels and the plurality of arms are configured to releasably secure the elongated shaft to the vehicle; and
   wherein pulling the pull device releases the engagement of the slide bar from the quick-release device, which in turn pivots the plurality of arms as the slide bar slides within the body, which in turn opens the plurality of plurality of channels.

* * * * *